Feb. 15, 1955 — B. PAASCHE — 2,702,148
FIGURE DISPLAY
Filed Aug. 4, 1951 — 2 Sheets-Sheet 1
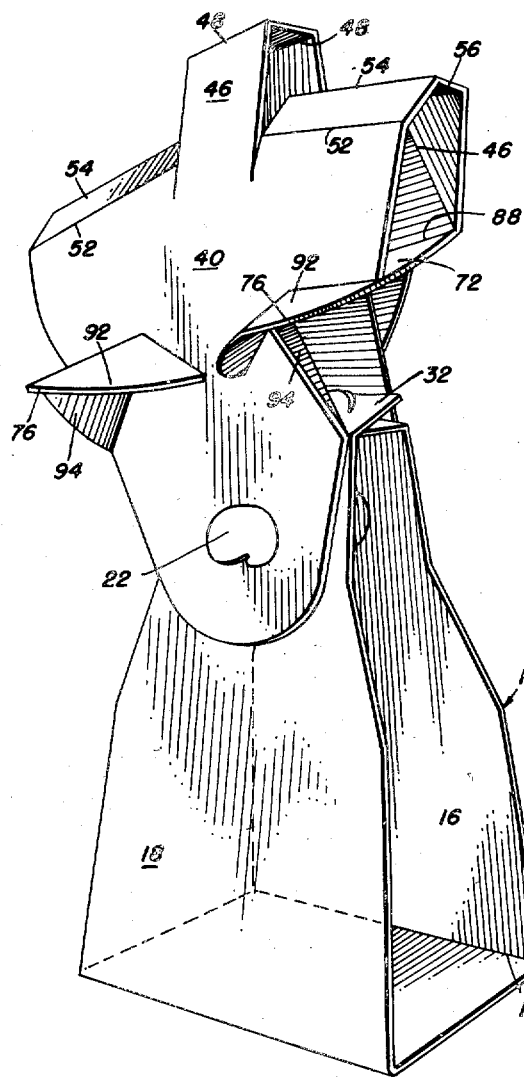
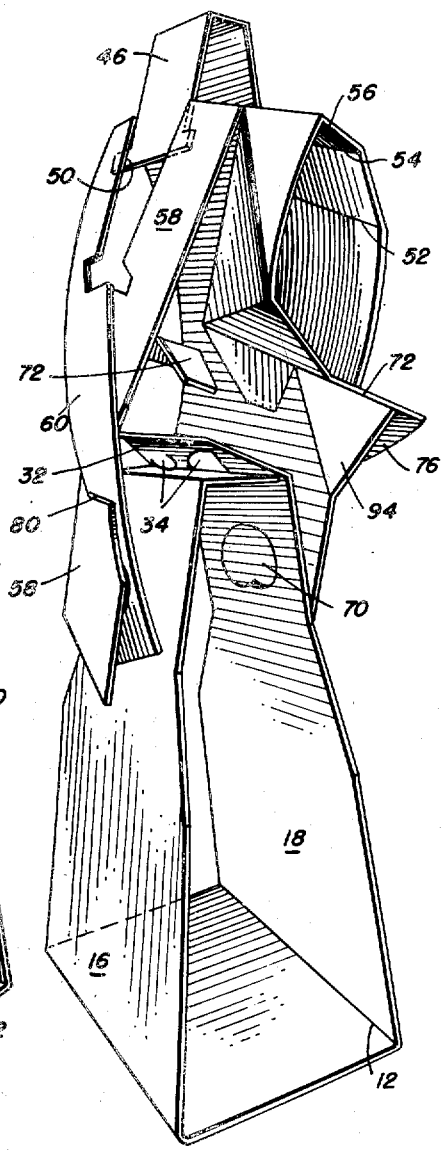
INVENTOR:
BERTHA PAASCHE
BY
ATT'Y

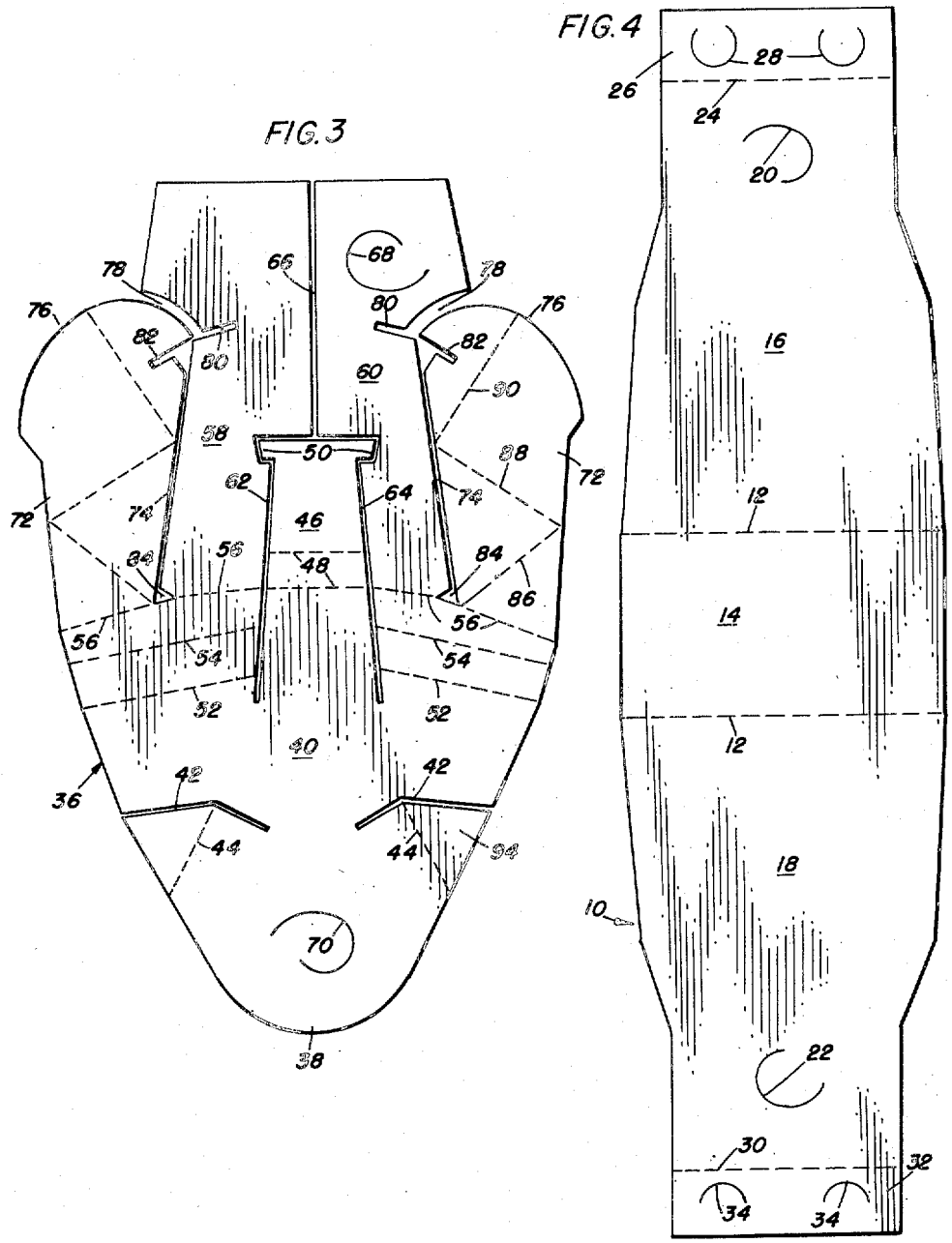

United States Patent Office 2,702,148
Patented Feb. 15, 1955

2,702,148

FIGURE DISPLAY

Bertha Paasche, Chicago, Ill.

Application August 4, 1951, Serial No. 240,420

6 Claims. (Cl. 223—68)

This invention relates in general to a figure display and is more particularly described as a foldable display which may be cut from sheet material and assembled and set up to represent a figure or a form for displaying clothing, particularly women's clothing.

Display forms as now commonly employed usually comprise solid bases or trunks representing a human form and are usually made to represent the entire contour of a human body or a portion thereof. These are cumbersome, expensive, and they are difficult to store and ship, requiring a considerable space, and they are easily broken and damaged.

The present invention proposes a display form which is made of sheet material by cutting cardboard, fiber, plastic or similar material in a predetermined manner and folding and connecting the pieces to somewhat resemble a human figure and to provide a display form upon which lingerie, waists, blouses and skirts may be mounted, assembled and draped for display purposes.

An important object of the invention is in the provision of a figure display in which a sheet of material may be cut, scored, folded and set up to represent a human figure or a portion thereof.

A further object of the invention is to combine two or more parts produced from sheet material in such a manner that they will produce a flexible human figure display in which one portion may be adjusted or varied with respect to the other.

A further object of the invention is to provide a figure display which is produced by a predetermined cutting and folding of sheet material which may be set up and different portions combined and the portions thereof disconnected for folding them flatly for shipment and storage.

Other objects of the invention will appear in the specification and will be apparent from the accompanying drawings in which, Fig. 1 is a front perspective of a figure display in accordance with this invention;

Fig. 2 is a side perspective of the form shown in Fig. 1 taken from the back thereof;

Fig. 3 is a plan view showing the cutting and scoring of a plain piece of sheet material from which the upper portion of the figure display is made; and Fig. 4 is a plan view of a piece of sheet material cut and scored to provide a supporting base for the display portion shown in Fig. 3.

The figure displays now commonly employed are usually in the form of mannequins having a complete body with head, arms and legs. Sometimes they are modified by omitting the legs or arms, but usually they are in solid rounded body form, molded to shape, and are expensive and cumbersome. The present invention is intended to provide a light, inexpensive partial form without head, arms or legs, but having a neck extremity and a general outline of a female form designed to attractively support and display various articles of female apparel.

Referring now more particularly to the drawings, a supporting base 10 comprises a somewhat elongated strip separated by fold lines 12 to form a bottom 14 and sides 16 and 18. Near the outer end of one side 16 is a curved cut-out 20 and adjacent the end of the other side 18 is a curved cut-out 22. A fold line 24 at the outer end of the side 16 forms a top portion 26 in which are locking cut-outs 28. A fold line 30 near the end of the other side 18 forms a top section 32 in which are locking cut-outs 34 adapted to engage the cut-outs 28 when this base is set up by folding the sides upwardly from the bottom 14 on the fold lines 12 and folding the top portions 26 and 32 in overlapping relation interengaging the tabs and the cut-outs 28 and 34. This provides a supporting base with cut-outs 20 and 22 at opposite sides thereof by means of which other figure portions may be attached thereto for a limited arcuate movement. A body cut-out 36 of sheet material is shown in its plain form in Fig. 3 and comprises a rounded extremity 38 separated from a wider body portion 40 by opposite angular slots 42 having fold lines 44 extending from each outer side into the apex of the corresponding slot 42.

Extending oppositely from the extremity 38 is a central tongue 46 with score and fold lines 48 adapting it to be folded upon itself to produce a neck projection and with a wider head 50 at the end of the tongue. At the sides of the tongue are sets of score and fold lines 52, 54 and 56 on opposite sides of the tongue at a slight angle to each other adapting this portion of the body to be folded partially together to form shoulder extensions at the sides of a neck piece formed by the tongue 46, the shoulders sloping downwardly therefrom as shown more clearly in Fig. 1.

Extending from the body portion at the sides of the tongue 46 are straps 58 and 60, the inner edges of which conform to the shape of the adjacent half of the tongue due to the cuts 62 and 64 respectively and the outer ends of these straps are separated by a cut 66. In one of the straps 60 is a curved cut-out 68 which is adapted to engage a pivoting cut-out 20 or 22 of the base 10. In the rounded extremity 38 is a curved cut-out 70 also adapted to engage one of the curved cut-outs 20 or 22 of the base 10. These cut-outs are located so that by interengaging the corresponding parts, the front of the body portion 40 may be raised slightly when the cut-out 70 is engaged with one of the cut-outs 22 and may be lowered correspondingly when engaged with the other cut-out 20. The result of this is to tilt or incline the body differently depending upon which connection is made.

At the outer sides of the straps 58 and 60 are side projections 72 each separated from the straps by a slit 74 and having a rounded outer projection 76 spaced slightly from the adjacent strap by a slot 78 and having slots 80 and 82 formed in the strap and side projection 72 at the inner end of the slot 78. At the inner end of each slot 74 is a small triangular cut-out 84 which partially defines the shoulder fold line 56 upon which each of the side projections 72 is folded, this cut-out 84 further facilitating the folding and separation of the straps, side projections and the shoulder portions of the body.

Each of the side projections has angular score and fold lines 86, 88 and 90 extending angularly from each other and the latter fold line 40 substantially normal to the slot 82 and terminating at its outer end in the rounded outer projection 76. These fold lines form panels which permit the side projections to be folded relatively to each other and to the body portion and below the shoulder so that the slot 82 will engage in the slot 42 at the same side of the body portion with the rounded outer portion 76 projecting beyond the front of the body portion, until the fold line 90 substantially intersects the fold line 44 at the apex of the slot 42, thereby forming an angular breast extension 92 with a rounded outer contour produced by the rounded outer edge 76. In this position, an outer angular flap 94 formed by the fold line 44 of the body portion may be frictionally adjusted below the breast extension 92 for varying and upholding it in a forwardly extending position.

The straps 58 and 60 are crossed at the rear of the body so that the slots 80 at the outer sides thereof are interengaged and at the same time the head 50 of the tongue 46 is confined between the crossed straps so that the tongue is held uprightly above the shoulders as a neck projection, also separating and distending the straps at the rear of the shoulder as shown more clearly in Fig. 2. The strap 60 which carries the pivoting cut-out 68 is folded inwardly at the lower end so that this cut-out will engage either the cut-out 20 or the cut-out 22 of the base depending upon which way the body is set thereon.

These pivoting cut-outs usually embrace more than a semi-circle so that when once engaged, they will permit a relative movement of the body with respect to the base in an arc about these pivoting portions. Thus the body may be set at different angles and due to the friction of the parts since the sheet material is more or less flexible, the body and the other parts will tend to remain in any adjusted position in which it is set. This is generally true of the breast projections, the neck, and the straps 58 and 60, thus permitting the body to be adjusted and arcuately varied within predetermined limits without disengaging the parts.

While the invention has been described in detail, it should be regarded as illustrations or examples rather than limitations or restrictions of the invention, since various changes in the construction, combination, and arrangement of the parts may be made without departing from the spirit and scope of the invention.

I claim:

1. A display form, comprising sheet material cut, scored and folded to simulate a female torso having a generally unbroken front portion extending upwardly and over at the sides to form shoulders, a pair of integral straps crossed and interengaging at the back and with side projections at the back extending forwardly, the sides of the front portion having slots at the sides of the front portion with angularly related portions into which the projections of the back extend to provide breast projections modified in accordance with the shape of the slots, an angular part of the front body portion below each of the slots being turned inwardly against the breast projections inserted in the slots to engage below the said breast projections and to hold them upwardly in distended position.

2. A display form comprising a single sheet of flexible material, cut, scored and folded to provide a simulated female torso having a generally plain front portion extending upwardly and over at the sides to form shoulders, and a pair of straps crossed and interengaged at the back with an intermediate tongue forming a neck projection extending upwardly from the said front projection and having means for engaging the crossed straps at the rear and limiting the upward movement of the rear portion of the neck projection.

3. In a display form composed of a single piece of material, cut, scored and folded to provide a hollow simulated female torso, a front portion having a lower end with a mounting cut out therein, and a pair of back forming straps extending from the upper part of the front portion, the straps having slots in their relatively outer edges adapted to interengage when the straps are crossed at the back of the front portion and one of the straps having a cut-out corresponding to that in the front portion by means of which the torso is mounted.

4. A display form comprising a single sheet of flexible material, cut, scored and folded to resemble a hollow simulated female torso having a generally plain front portion and angularly related neck and shoulder portions, a pair of back straps extending downwardly from the shoulder portions having means for interengaging them, an intermediate tongue between the shoulder portions and the straps extending upwardly from the front portion and having a projecting head at the outer end to engage below the straps, the lower end of one of the straps and the lower end of the front portion having mounting cut-outs generally opposite each other, and a supporting base engaged by the mounting cut-outs and movable in a limited arc on the base by said cut-outs.

5. A display form comprising a single sheet of resilient material, cut, scored and folded to provide a hollow simulated torso with a generally plain front portion and interengaged straps at the back of the torso, the lower end of one of the straps and the lower end of the front portion having substantially opposite circular mounting cut-outs, a supporting base formed of sheet material having a bottom, upwardly extending sides bent inwardly to overlap and joined at the top above the base and circular side cut-outs near the said top adapted to be engaged by the front and rear cut-outs of the torso and adapting the torso to be rotated about the mounting cut-outs for adjusting it in a limited arc.

6. In a display form, a base of sheet material, cut, scored and folded to provide a bottom, upwardly extending sides, and interengaging top portions to space the sides apart, a circular mounting cut-out in the upper portion of each extending side and generally opposite each other, a hollow body of sheet material, cut, scored and folded to provide a simulated torso with a front portion having a cut-out at its lower end and a pair of interengaged back straps at least one of which has a mounting cut-out near its lower end, the two cut-outs of the torso adapted to engage the cut-outs of the base and permitting a relative arcuate adjustment and movement of the torso upon the base.

References Cited in the file of this patent

UNITED STATES PATENTS 2,479,140     Shafarman _____ Aug. 16, 1949